(12) United States Patent
Chang

(10) Patent No.: US 7,446,959 B2
(45) Date of Patent: Nov. 4, 2008

(54) ACTUATOR AND AUTO-FOCUS IMAGING SYSTEM USING SAME

(75) Inventor: Jen-Tsorng Chang, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 210 days.

(21) Appl. No.: 11/610,666

(22) Filed: Dec. 14, 2006

(65) Prior Publication Data

US 2008/0037142 A1 Feb. 14, 2008

(51) Int. Cl.
*G02B 7/02* (2006.01)
(52) U.S. Cl. ..................................... 359/814
(58) Field of Classification Search ......... 359/704–706, 359/814, 823–825, 830; 396/82, 83, 133
See application file for complete search history.

(56) References Cited

U.S. PATENT DOCUMENTS

2005/0007683 A1* 1/2005 Ryu et al. ................. 359/824

\* cited by examiner

*Primary Examiner*—Alicia M Harrington

(57) ABSTRACT

An actuator includes at least one actuator unit. The actuator unit includes a ring, a plurality of first actuator elements, and a plurality of second actuator elements disposed on the ring. Each of the first actuator elements includes a first driving piece and a second driving piece attached to each other. The first driving piece is attached to the ring and is located between the second driving piece and the ring. A coefficient of thermal expansion of the first driving piece is larger than that of the second driving piece. Each of the second actuator elements includes a third driving piece and a fourth driving piece attached to each other. The third driving piece is attached to the ring and is located between the fourth driving piece and the ring. A coefficient of thermal expansion of the third driving piece is less than that of the fourth driving piece.

18 Claims, 7 Drawing Sheets

ACTUATOR AND AUTO-FOCUS IMAGING SYSTEM USING SAME

BACKGROUND OF THE INVENTION

1. Field of the Invention

The present invention relates generally to the optical imaging field and, more particularly, to an actuator and an auto-focus imaging system using the actuator.

2. Description of Related Art

Auto-focus techniques have been widely employed in various imaging systems, including still camera systems and video camera systems. Nowadays there are basically two main auto-focus methods: one is an active focus (i.e., distance metering) method, and the other is a passive focus (i.e., focus detection) method. In particular, the passive focus method mainly employs a charge-coupled device (CCD) and works by evaluating the amount of contrast or the phase difference in a scene. The active focus method usually uses an infrared light or ultrasound emitter and a corresponding receiver in a triangular surveying system, the data thus generated being converted by a microprocessor (e.g., a well-known digital signal processor) into information about distance and thereby enabling the automatic focusing by an auto-focus imaging system.

Generally, a digital auto-focus camera system includes an optical imaging assembly, an image sensor, a control unit, and an actuator. The optical imaging assembly usually includes a movable lens assembly. The image sensor can be a CCD or a complementary metal oxide semiconductor device (CMOS). The control unit can be, for example, a digital signal processor or an image signal processor. The actuator commonly includes a stepper motor and a drive circuitry. The drive circuitry, regulated by the control unit, can drive the stepper motor to perform a rotational movement. In order to carry out the position adjustment of the movable lens assembly in an automatic focusing process, a gear assembly has necessarily been employed in the lens movement system to transform the rotational movement of the stepper motor into linear movement. However, the existence of the gear assembly generally renders the lens positioning system unduly bulky. Furthermore, the occurrence of backlash/recoil in the gear assembly will usually result in a degraded focusing accuracy.

It is therefore desirable to find a new actuator and a new auto-focus imaging system, which can overcome the above mentioned problems.

SUMMARY OF THE INVENTION

In a preferred embodiment, an actuator includes at least one actuator unit. The actuator unit includes a ring, a plurality of first actuator elements, and a plurality of second actuator elements disposed on the ring. Each of the first actuator elements includes a first driving piece and a second driving piece attached to each other. The first driving piece is attached to the ring and is located between the second driving piece and the ring. A coefficient of thermal expansion of the first driving piece is larger than that of the second driving piece. Each of the second actuator elements includes a third driving piece and a fourth driving piece attached to each other. The third driving piece is attached to the ring and is located between the fourth driving piece and the ring. A coefficient of thermal expansion of the third driving piece is less than that of the fourth driving piece.

BRIEF DESCRIPTION OF THE DRAWINGS

Many aspects of embodiments can be better understood with reference to the following drawings. The components in the drawings are not necessarily drawn to scale, the emphasis instead being placed upon clearly illustrating the principles of the present embodiment. Moreover, in the drawings, like reference numerals designate corresponding parts throughout the several views.

DETAILED DESCRIPTION OF THE INVENTION

Embodiments will now be described in detail below with reference to the drawings.

Figure 1:
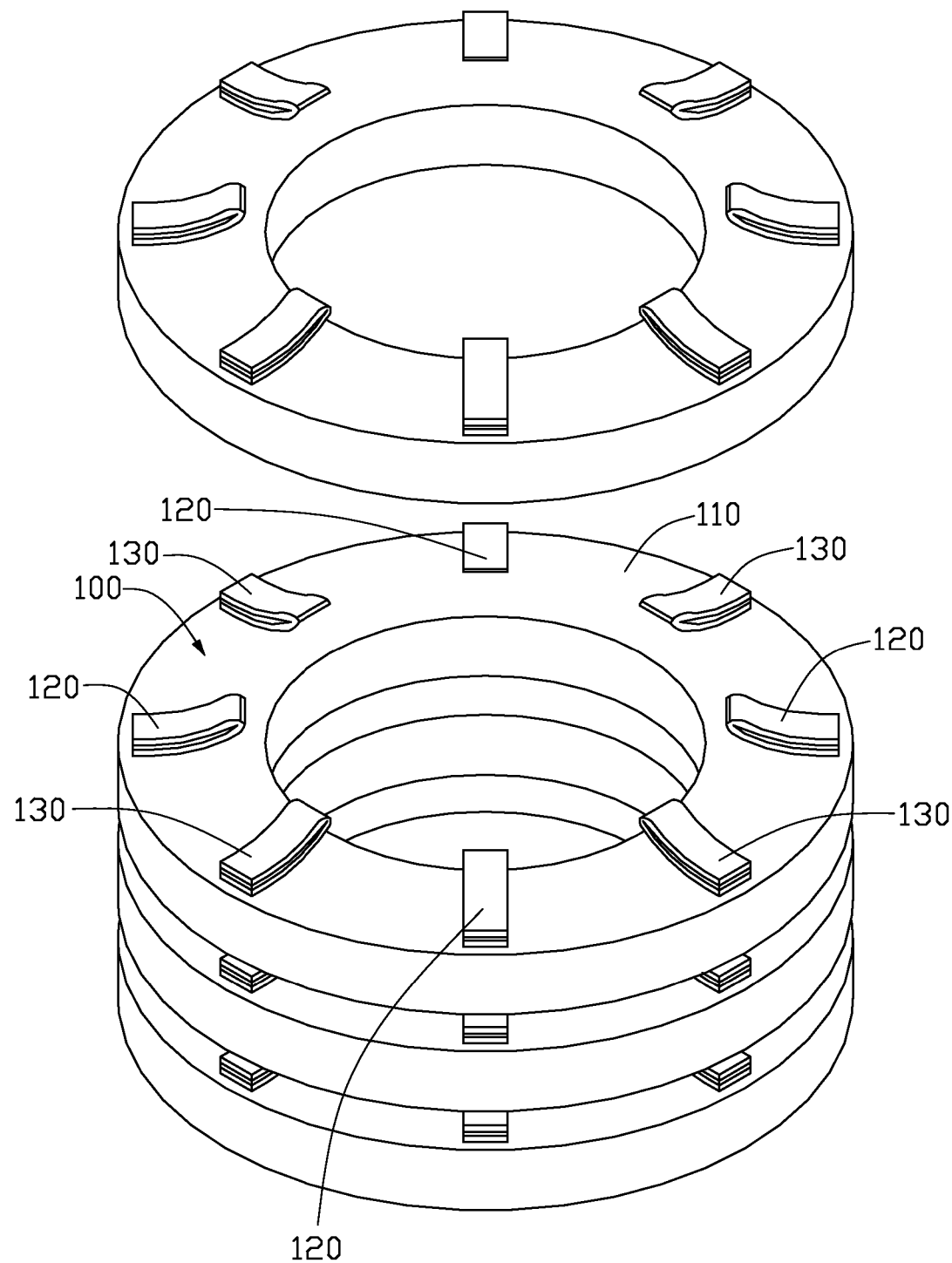
FIG. 1 is a schematic, isometric view of an actuator according to a first embodiment.

Referring to FIG. 1, an actuator 10 according to a first embodiment is shown. The actuator 10 includes a plurality of actuator units 100 located in overlapping positions. The actuator unit 100 includes a ring 110, a plurality of first actuator elements 120 and second actuator elements 130 (different from the first actuator elements 120, described in detail later). The first actuator elements 120 and the second actuator elements 130 are disposed on the ring 110 in an alternating fashion. Both the first actuator elements 120 and the second actuator elements 130 can be positioned so as to be separated by even spaces on the ring 110. One end of each of the first actuator elements 120 is attached to a surface of the ring 110, and the other end is attached to a ring of another actuator unit directly on the actuator unit 100. It should be noted that the other end of each of the second actuator elements 120 can be in contact with but not attached to another ring. It can be understood that the other end of each of the first actuator elements 120 can be attached to other element (e.g., a barrel 31 shown in FIG. 4) using glue 37. Likewise, one end of each of the second actuator elements 130 is attached to a surface of the ring 110, and the other end is attached to a ring of another actuator unit directly on the actuator unit 100. It can be understood that the other end of each of the second actuator elements 120 can be attached to other element (e.g., a barrel 31 shown in FIG. 4) using glue 37.

Figure 2:
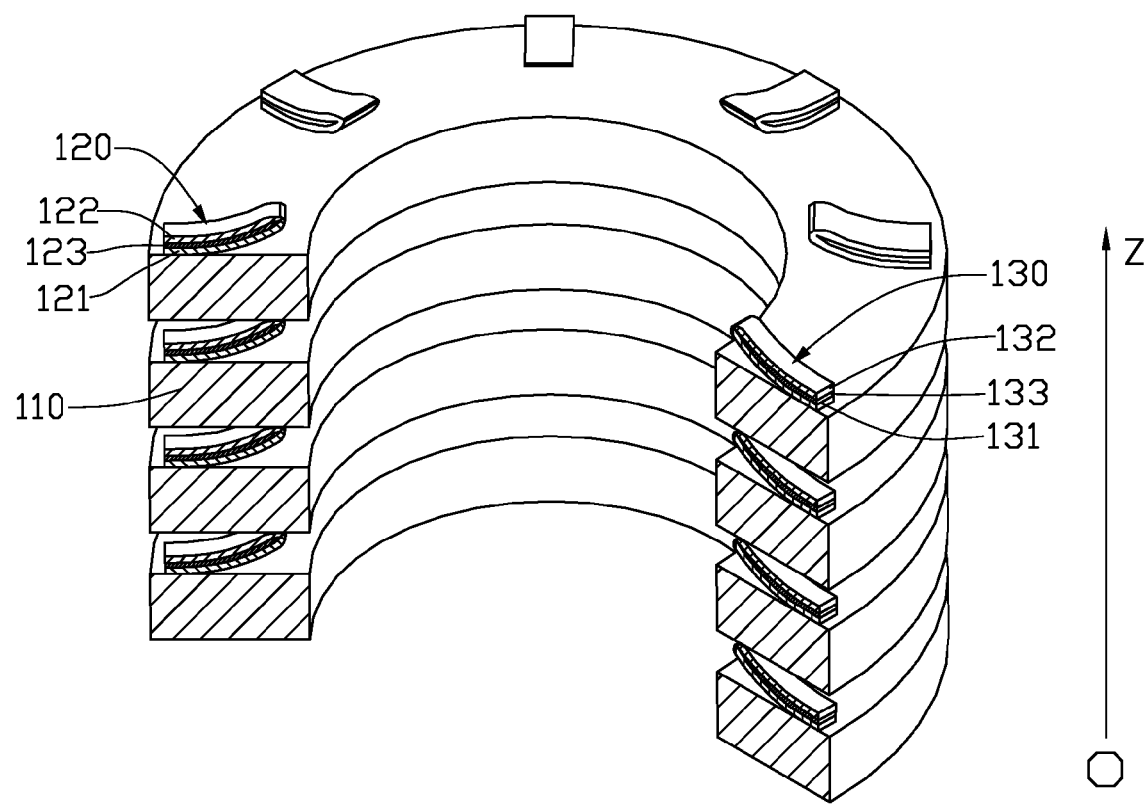
FIG. 2 is a schematic, partial section view of the assembled actuator of FIG. 1.

Referring to FIG. 2, each first actuator element 120 includes a first driving piece 121, a dielectric layer 123, and a second driving piece 122 oriented in a Z direction. The first driving piece 121 and the second driving piece 122 are both flexible and electrically connected to each other. A coefficient of thermal expansion (CTE) of the first driving piece 121 is larger than that of the second driving piece 122. In other words, the first driving piece 121 expands more than the second driving piece 122 in response to a set amount of heat. Due to the expansions of the first driving piece 121 and the second driving piece 122, the first actuator elements 120 bend upwards along the Z direction. A material of the first driving piece 121 and the second driving piece 122 can be selected from the group consisting of metals and electrically conductive ceramics. The material of the first driving piece 121 is aluminium, and the material of the second driving piece 122 is copper in the present embodiment.

The second actuator elements 130 are similar to the first actuator elements 120, but a CTE of the third driving piece 131 is less than that of the fourth driving piece 132. In other words, the third driving piece 131 expands less than the fourth driving piece 132 in response to a set amount of heat. Due to the expansions of the third driving piece 131 and the fourth driving piece 132, each second actuator element 120 bends downwards along the Z direction. A material of the third driving piece 131 is copper, and a material of the fourth driving piece 132 is aluminium in the present embodiment.

Figure 3:
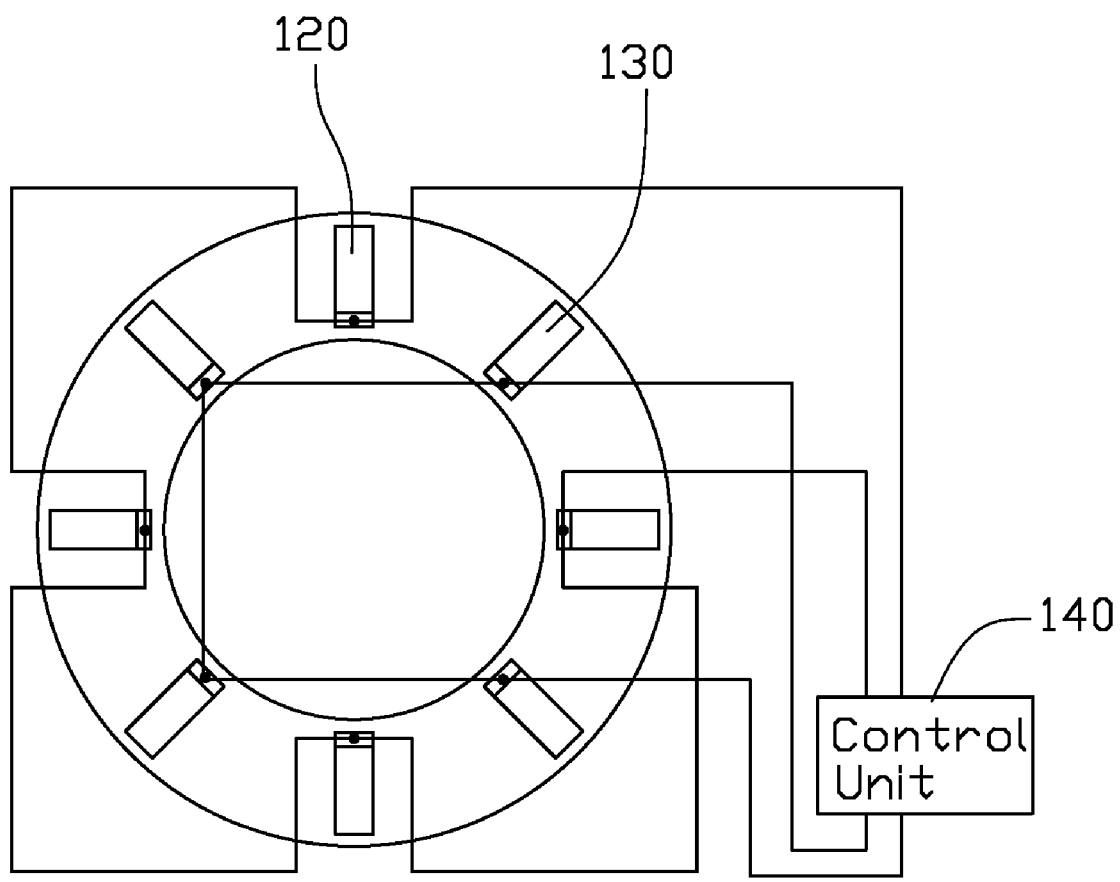
FIG. 3 is a schematic, plan view of the actuator of FIG. 1 connecting with a control unit.

Referring to FIG. 3, the first actuator elements 120 and the second actuator elements 130 are all electrically connected to a control unit 140. The control unit 140 feeds separate voltages to the first actuator elements 120 and the second actuator elements 130, thus separately heating them and controlling their expansions by flowing a current therethrough.

Referring to FIGS. 1 to 3, the way in which the actuator works will be described in detail as follows. When the control unit 140 feeds a voltage to the first actuator elements 120 and heats them, the first driving pieces 121 expand more than the second driving pieces 122 in response to heating due to their different CTEs. Provided that the bottom ring 110 (i.e., the ring in a lowest position in the Z direction) is fixed, the first actuator elements 120 bend upwards along the Z direction. The second actuator elements 130 are forced to bend upwards together with the first actuator elements 120 due to their flexibility. Thus the top ring 110 (i.e., the ring topmost in the Z direction) moves upwards relative to the bottom ring 110. Total distance moved by the top ring 110 relative to the bottom ring 110 is a sum of distances between adjacent rings. The total distance can be controlled by adjusting the voltage and heating time.

Likewise, when the control unit 140 feeds a voltage to the second actuator elements 130 and heats them, the third driving pieces 131 expand less than the fourth driving pieces 132 in response to heating due to their different CTEs. Provided that the bottom ring 110 is fixed, the second actuator elements 130 should bend downwards along the Z direction. The first actuator elements 120 are forced to bend downwards together with the second actuator elements 130 due to their flexibility. Thus the bottom ring 110 moves downwards relative to the top ring 110. Total distance moved by the bottom ring 110 relative to the top ring 110 is a sum of distances between adjacent rings.

Figure 4:
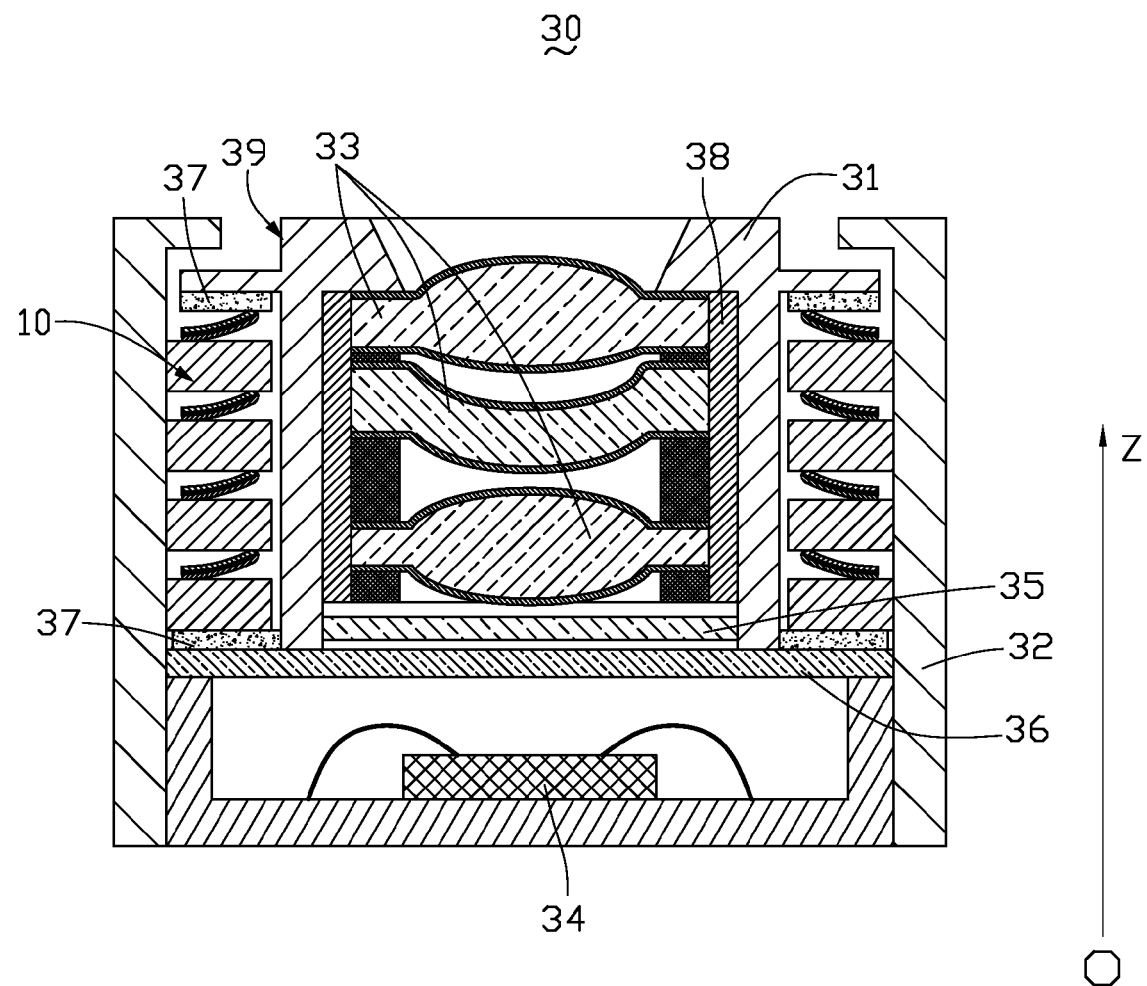
FIG. 4 is a schematic, cross-sectional view of an auto-focus imaging system employing the actuator of FIG. 1.

Referring to FIG. 4, an auto-focus imaging system 30 employing the actuator 10 according to a first embodiment is shown. The auto-focus imaging system 30 includes a housing 32, a barrel unit 39 received into the housing 32, an actuator 10, an image sensor 34, and a transparent plate 36 covering the image sensor 34. The barrel unit 39 includes a barrel 31, a lens unit 33, and a filter 35. The lens unit 33 and the filter 35 are received into the barrel 31 in this order from an object side to an image side, and are attached using a fixture 38. The lens unit 33 includes a plurality of lenses, and includes three lenses in the present embodiment. The lens can be an aspheric lens. A material of the lens can be selected from the group consisting of glass and plastic. The filter 35 can be an infrared-cut filter. The image sensor 34 is disposed in the housing 32. The image sensor 34 can be a CCD or a CMOS device. The transparent plate 36 prevents the image sensor 34 from becoming polluted.

One end of the actuator 10 is connected to the barrel 31 using glue 37, the other end is connected to the transparent plate 36 using glue 37. The actuator 10 is configured for driving the barrel unit 39 to any desired position to achieve an appropriate focus. That is, the actuator 10 is configured for adjusting a distance between the barrel unit 39 and the image sensor 34, thus achieving an auto-focus function.

Referring to FIGS. 1 to 4, operation of the auto-focus imaging system 30 is described as follows. First, the control unit 140 determines a distance that the barrel unit 39 needs to move in order to achieve an appropriate focus. Then the control unit 140 feeds separate voltages to the first actuator elements 120 and the second actuator elements 130, thus separately controlling their expansions and driving the barrel unit 39 to any desired position to achieve an appropriate focus. When the control unit 140 feeds a voltage to the first actuator elements 120, the first actuator elements 120 bend upwards along the Z direction. The barrel unit 39 therefore moves towards the image sensor 34 to achieve an appropriate focus. When the control unit 140 feeds a voltage to the second actuator elements 130, the second actuator elements 130 bend downwards along the Z direction. The barrel unit 39 therefore moves away from the image sensor 34 to achieve an appropriate focus. In other words, the image sensor 34 is moved relative to the barrel unit 39 to achieve an appropriate focus. Due to the actuator, the auto-focus imaging system 30 has a compact configuration.

Figure 5:
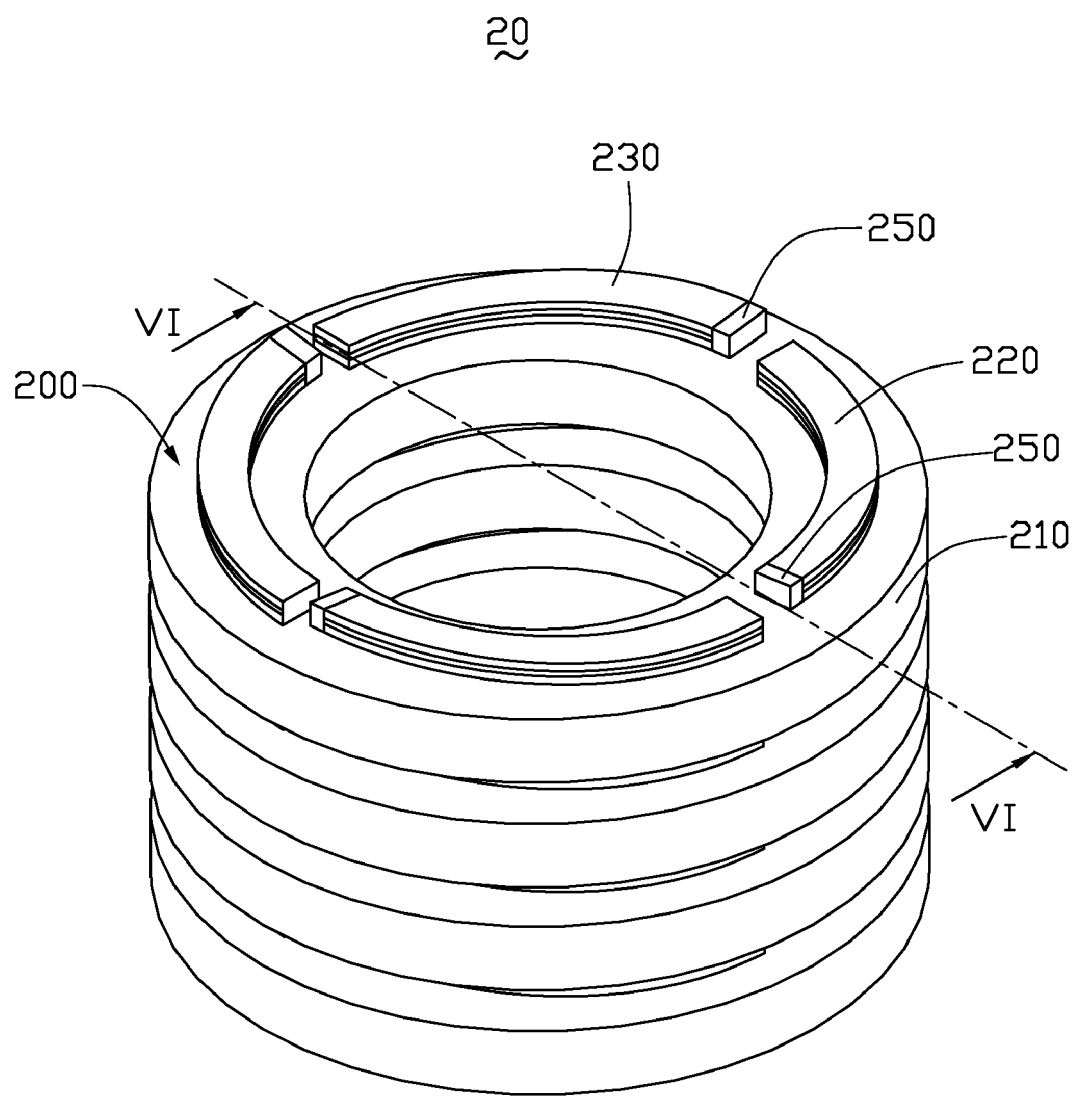
FIG. 5 is a schematic, isometric view of an actuator according to a second embodiment.
Figure 6:
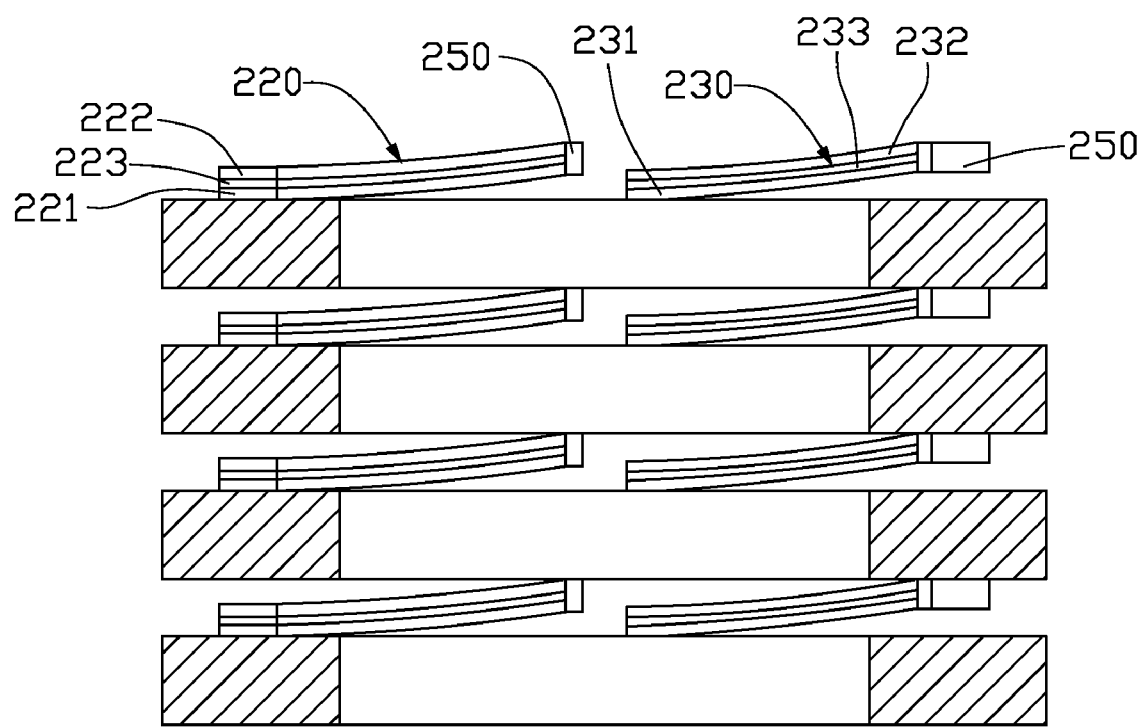
FIG. 6 is a schematic, cross-sectional view of the actuator of FIG. 5 taken along the line of VI-VI thereof.

Referring to FIG. 5 and 6, an actuator 20 according to a second embodiment is shown. The actuator 20 is similar to the actuator 10, but both first actuator elements 220 and second actuator elements 230 are arc-shaped. Each first actuator element 220 includes a first driving piece 221, a dielectric layer 223, and a second driving piece 222. The first driving piece 221 and the second driving piece 222 are connected using a conductor 250. The conductor 250 is heated and then heat is transferred to the first driving piece 221 and the second driving piece 222. The second actuator elements 230 includes a third driving piece 231, a dielectric layer 233, and a fourth driving piece 232. The third driving piece 231 and the fourth driving piece 232 are connected using a conductor 250.

Figure 7:
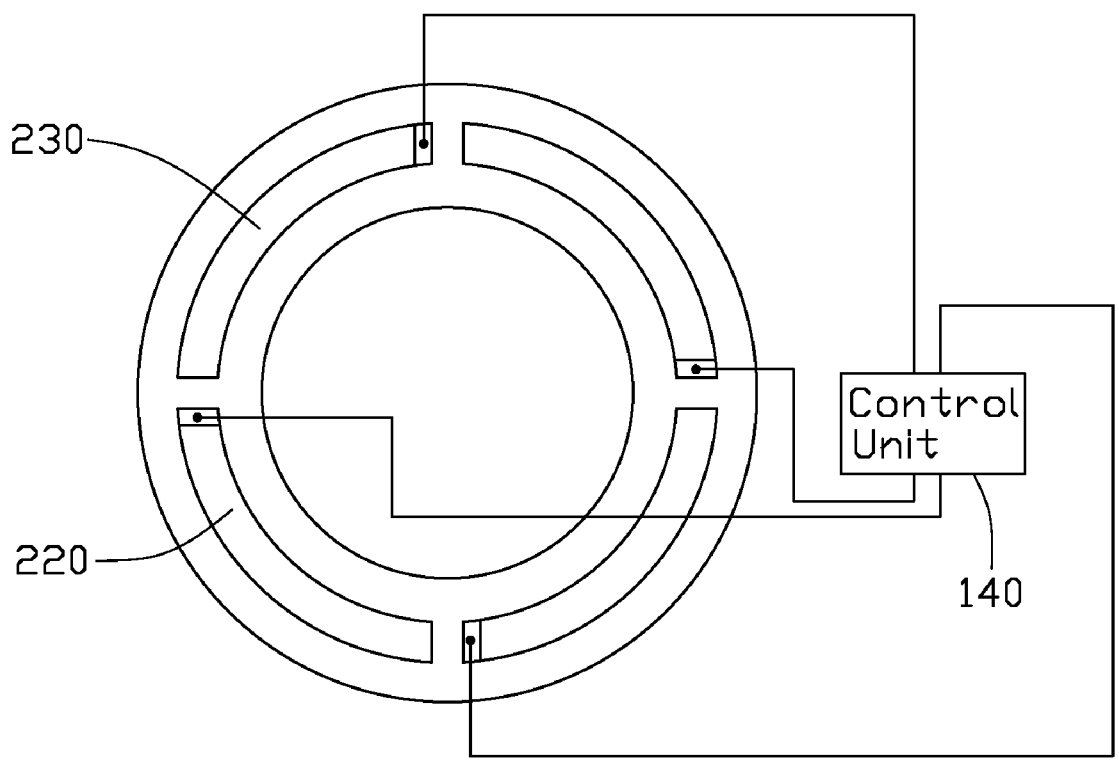
FIG. 7 is a schematic, plan view of the actuator of FIG. 5 connecting to a control unit.

Referring to FIG. 7, the conductors 250 of each actuator element are all electrically connected to a control unit 140. The control unit 140 feeds separate voltages to the conductors 250, thus separately heating them. Heat of the conductors 250 is then transferred to the first driving piece 221 and the second driving piece 222.

While certain embodiments have been described and exemplified above, various other embodiments will be apparent to those skilled in the art from the foregoing disclosure. The present invention is not limited to the particular embodiments described and exemplified but is capable of considerable variation and modification without departure from the scope of the appended claims.

What is claimed is:

1. An actuator comprising:
   at least one actuator unit, the actuator unit comprising:
      a ring;
      a plurality of first actuator elements disposed on the ring, each of the first actuator elements comprising a first driving piece and a second driving piece attached to each other, the first driving piece being attached to the ring and located between the second driving piece and the ring, wherein a coefficient of thermal expansion of the first driving piece is larger than that of the second driving piece; and
      a plurality of second actuator elements disposed on the ring, each of the second actuator elements comprising a third driving piece and a fourth driving piece attached to each other, the third driving piece being attached to the ring and located between the fourth driving piece and the ring, wherein a coefficient of thermal expansion of the third driving piece is less than that of the fourth driving piece.

2. The actuator as claimed in claim 1, wherein the first actuator elements and the second actuator elements are disposed on the ring in an alternating fashion.

3. The actuator as claimed in claim 1, further comprising a dielectric layer sandwiched between the first driving piece and the second driving piece of each of the first actuator elements, the first driving piece and the second driving piece being electrically connected to each other.

4. The actuator as claimed in claim 1, further comprising a dielectric layer sandwiched between the third driving piece and the fourth driving piece of each of the second actuator elements, the third driving piece and the fourth driving piece being electrically connected to each other.

5. The actuator as claimed in claim 1, wherein the at least one actuator unit includes a lower actuator unit and an upper actuator unit disposed on the lower actuator unit, wherein the fourth driving piece of the lower actuator element is connected to the ring of the upper actuator unit.

6. The actuator as claimed in claim 5, wherein the second driving piece of the lower actuator element is connected to the ring of the upper actuator unit.

7. The actuator as claimed in claim 1, wherein a material of each first driving piece and the second driving piece of each first actuator element is selected from the group consisting of metals and electrically conductive ceramics.

8. The actuator as claimed in claim 1, wherein a material of the third driving piece and the fourth driving piece of each second actuator element is selected from the group consisting of metals and electrically conductive ceramics.

9. The actuator as claimed in claim 1, wherein a material of each first driving piece of the first actuator element is the same as that of each fourth driving piece of each second actuator element.

10. The actuator as claimed in claim 9, wherein the material of each first driving piece of each first actuator element is aluminium.

11. The actuator as claimed in claim 1, wherein a material of each second driving piece of each first actuator element is the same as that of each third driving piece of each second actuator element.

12. The actuator as claimed in claim 1, wherein the material of each second driving piece of each first actuator element is copper.

13. The actuator as claimed in claim 1, further comprising a control unit electrically connected with the first driving elements and the second driving elements, the control unit being configured for heating the first driving elements and the second driving elements by flowing a current therethrough.

14. The actuator as claimed in claim 1, wherein each first actuator element is arc-shaped.

15. The actuator as claimed in claim 1, wherein each first actuator element is arc-shaped.

16. The actuator as claimed in claim 1, further comprising a heat conductor connected to each first driving piece and each second driving piece of each of the first actuator elements.

17. The actuator as claimed in claim 1, further comprising a conductor connected to the third driving piece and the fourth driving piece of each of the second actuator elements.

18. An auto-focus imaging system comprising:
a housing;
a plurality of lenses;
a barrel receiving the lenses therein, the barrel being disposed in the housing;
an image sensor disposed in the housing;
a transparent plate covering the image sensor; and
an actuator having one end thereof actuator connected to the barrel, and the other end thereof actuator connected to the transparent plate, the actuator being configured for adjusting a distance of the image sensor relative to the barrel, the actuator comprising at least one actuator unit, the actuator unit comprising:
a ring;
a plurality of first actuator elements disposed on the ring, each of the first actuator elements comprising a first driving piece and a second driving piece attached to each other, the first driving piece being attached to the ring and located between the second driving piece and the ring, wherein a coefficient of thermal expansion of the first driving piece is larger than that of the second driving piece; and
a plurality of second actuator elements disposed on the ring, each of the second actuator elements comprising a third driving piece and a fourth driving piece attached to each other, the third driving piece being attached to the ring and located between the fourth driving piece and the ring, wherein a coefficient of thermal expansion of the third driving piece is less than that of the fourth driving piece.

* * * * *